US005596604A

United States Patent [19]
Cioffi et al.

[11] Patent Number: 5,596,604
[45] Date of Patent: Jan. 21, 1997

[54] MULTICARRIER MODULATION TRANSMISSION SYSTEM WITH VARIABLE DELAY

[75] Inventors: John M. Cioffi, Cupertino; Po Tong, Fremont; James T. Aslanis, Mountain View; Antoinette H. Gooch, Palo Alto, all of Calif.

[73] Assignee: Amati Communications Corporation, San Jose, Calif.

[21] Appl. No.: 107,200

[22] Filed: Aug. 17, 1993

[51] Int. Cl.$^6$ ................................................ H04K 1/10
[52] U.S. Cl. ........................... 345/260; 371/43; 371/35
[58] Field of Search ................. 375/38, 39; 371/38.1, 371/39.1, 43, 35

[56] References Cited

U.S. PATENT DOCUMENTS

| | | | |
|---|---|---|---|
| 4,394,642 | 7/1983 | Currie et al. | 340/347 DD |
| 4,677,625 | 6/1987 | Betts et al. | 371/43 |
| 4,747,104 | 5/1988 | Piret | 371/39 |
| 4,852,102 | 7/1989 | Yamaguchi | 371/40 |
| 4,980,897 | 12/1990 | Decker et al. | 375/38 |
| 5,105,442 | 4/1992 | Wei | 375/39 |
| 5,107,504 | 4/1992 | Nakamura et al. | 371/37.1 |
| 5,243,629 | 9/1993 | Wei | 371/43 |
| 5,251,236 | 10/1993 | Brehmer et al. | 375/59 |
| 5,282,019 | 1/1994 | Basile et al. | 348/473 |
| 5,287,374 | 2/1994 | Parr | 371/43 |
| 5,305,352 | 4/1994 | Calderbank et al. | 375/39 |
| 5,321,725 | 6/1994 | Paik et al. | 375/39 |
| 5,392,300 | 2/1995 | Borth et al. | 371/43 |

OTHER PUBLICATIONS

Bingham, "Multicarrier Modulation for Data Transmission: An Idea Whose Time Has Come", *IEEE Communications Magazine*, pp. 5–(May 1990).

Chow et al., "A Discrete Multitone Transceiver System for HDSL Applications", *IEEE Journal on Selected Area in Communications*, vol. 9, No. 6, pp. 895–908 (Aug. 1991).

Chow et al., "Performance Evaluation of a Multichannel Transceiver System for ADSL and VHDSL Services", *IEEE Journal on Selected Areas in Communications*, vol. 9, No. 6, pp. 909–919 (Aug. 1991).

Fleming et al., "ADSL: The On-Ramp to the Information Highway", *Telephony*, pp. 20, 24–26 (Jul. 1993).

Clark et al., "Interleaver Structures for Coded Systems", *Error–Correction Coding for Digital Communications*, Section 8.3, pp. 347–349.

*Primary Examiner*—Stephen Chin
*Assistant Examiner*—T. Ghebretinsae
*Attorney, Agent, or Firm*—Hickman Beyer & Weaver, LLP

[57] ABSTRACT

A transmission system using multicarrier modulation applies FECC (forward error correcting code) coding and codeword interleaving differently to input signals from a plurality of different data channels to produce encoded data signals having different reliabilities and different coding delays. Bits of encoded data signals having relatively less delay are allocated to carriers that are subject to relatively more attenuation and/or channel noise, and hence that are allocated fewer bits for transmission in each symbol period, to reduce the effects of impulse noise. The data channels can comprise video, data, and control channels transmitted on an ADSL (asymmetric digital subscriber line) two-wire telephone line.

22 Claims, 3 Drawing Sheets

MULTICARRIER MODULATION TRANSMISSION SYSTEM WITH VARIABLE DELAY

This invention relates to transmission systems using multicarrier modulation, also known as discrete multitone (DMT) modulation where, as is desirable, the modulation is effected using a discrete Fourier Transform.

BACKGROUND OF THE INVENTION

The principles of multicarrier modulation are described for example in "Multicarrier Modulation For Data Transmission: An Idea Whose Time Has Come" by John A. C. Bingham, IEEE Communications Magazine, Vol. 28, No. 5, pages 5–14, May 1990. As is known, in a transmission system using multicarrier modulation, FDM (frequency division multiplex) carriers spaced within a usable frequency band of a transmission channel, forming a set of subchannels, are modulated at a block or symbol transmission rate of the system. The bits of input data for transmission within each block or symbol period are allocated to the carriers or subchannels so that the bit error rates of the subchannels as monitored at the receiver, are substantially equal. As a result, the different subchannels carry different numbers of bits in each symbol period. With an appropriate allocation of bits and transmit powers to the carriers or subchannels, such a system provides a desirable performance.

The characteristics and performance of one such system, for communicating data at a rate of 1.6 Mb/s over a twisted pair channel using 256 subchannels, is described in "A Discrete Multitone Transceiver System For HDSL Applications" by J. S. Chow et al., IEEE Journal On Selected Areas In Communications, Vol. 9, No. 6, pages 895–908, August 1991. A companion paper by P. S. Chow et al. entitled "Performance Evaluation Of A Multichannel Transceiver System For ADSL and VHDSL Services", at pages 909–919 of the same publication, addresses a similar system applied to an asymmetric digital subscriber line (ADSL).

An article by S. Fleming et al. entitled "ADSL: The on-ramp to the information highway", Telephony, Jul. 12, 1993, pages 20–26 describes one example of an ADSL arrangement applied to a two-wire telephone subscriber line, in which four asymmetric 1.5 Mb/s channels are provided for transmission in a downstream direction from a telephone CO (central office) to a subscriber, in addition to various data channels and POTS (plain old telephone service) carried symmetrically (i.e. bidirectionally) on the line. The data channels for example comprise an ISDN (integrated services digital network) H0 channel at 384 kb/s or an ISDN basic access channel at 144 kb/s, and a control channel for example at a bit rate of 16 kb/s. The four asymmetric channels provide a total bandwidth of 6 Mb/s that can be used for digital video signals.

A well known problem in the art of transmission systems is that of impulse noise, which can produce bursts of errors on transmission channels. In order to address this problem, it is known to apply forward error correction coding (FECC) and interleaving techniques in which a block of input data to be transmitted is augmented with parity data that enables one or more errors in the block to be detected and corrected, the input data and parity data constituting a codeword, and over time parts of different codewords are interleaved for transmission to reduce the effect of error bursts on individual codewords. For example, Currie et al. U.S. Pat. No. 4,394,642 issued Jul. 19, 1983 and entitled "Apparatus For Interleaving and De-Interleaving Data" describes one such arrangement. The interleaving can instead be convolutional interleaving, for example as described in Section 8.3.1.2 of "Error-Correction Coding for Digital Communications" by George C. Clark, Jr. and J. Bibb Cain, Plenum Press, pages 347–349.

The use of FECC increases the bit rate required of the actual transmission system in dependence upon the parity overhead, i.e. the size of the parity data relative to the codeword size, and increases complexity. The interleaving process increases immunity to error bursts due to impulse noise, but adds transmission delay. Longer periods over which the interleaving is effected result in greater immunity to impulse noise, but greater transmission delays. Thus there is a trade-off between high reliability (requiring effective error correction and immunity to impulse noise) and short transmission delay.

Different types of signals, which may be required to be transmitted via a single transmission system, may have different requirements for reliability and transmission delay. For example, digital video signals that are highly compressed require a high reliability for their transmission, and ISDN voice signals must meet strict transmission delay requirements. In known transmission systems, it has been necessary to provide a compromise between high reliability and transmission delay for different types of signals.

It is also known to apply trellis code modulation (TCM) techniques to a system using multicarrier modulation in order to improve the performance of the system through the coding gain provided by the trellis coding. For example, Decker et al. U.S. Pat. No. 4,980,897 issued Dec. 25, 1990 and entitled "Multi-Channel Trellis Encoder/Decoder" discloses such a system in which the encoding and decoding processes operate on all of the subchannels sequentially in order to reduce delay. As is well known, TCM results in sequences of transmitted signal constellation points that have a greatly increased separation, hence the improved performance, and necessitates more complex decoding involving maximum likelihood sequence estimation, usually implemented using the Viterbi algorithm.

The performance improvements that are provided by TCM and by FECC as described above are largely independent of one another, so that TCM and FECC can be used together in a transmission system.

In Betts et al. U.S. Pat. No. 4,677,625 issued Jun. 30, 1987 and entitled "Distributed Trellis Encoder" there is described an FECC arrangement in which interleaving is effected by switching among a plurality of trellis coders with delay units, with corresponding switching among a plurality of trellis decoders at a receiver. The use of a plurality of encoders and decoders in such a manner undesirably adds to the costs and complexity of the arrangement. The Betts et al. patent relates to a transmission system using QAM (quadrature amplitude modulation) of a single carrier, and not to a transmission system using multicarrier modulation.

An object of this invention is to provide an improved transmission system using multicarrier modulation.

SUMMARY OF THE INVENTION

According to one aspect of this invention there is provided a data transmission system using multicarrier modulation, comprising: FECC (forward error correction code) coding and codeword interleaving apparatus arranged for differently encoding a plurality of data signals to provide a plurality of encoded data signals with different delays through the coding and interleaving apparatus; and a modulator arranged to modulate bits of the encoded data signals onto multiple carriers of the transmission system, different numbers of bits in each transmission symbol period being allocated to different carriers.

The different delays through the coding and interleaving apparatus correspond to different levels of coding and/or interleaving and hence to different degrees of reliability of the transmitted signals, especially with respect to their immunity to impulse noise, the least delayed signals being the most vulnerable to impulse noise. Thus each signal to be transmitted can be communicated with an individually selected compromise between high reliability and short transmission delay.

In order to compensate for the greater vulnerability of the least delayed (i.e. least interleaved) signals to impulse noise, preferably the modulator is arranged to allocate bits of encoded data signals having relatively less interleaving to carriers carrying relatively fewer bits in each symbol period. The greater transmission attenuation of such carriers, which for signal transmission are compensated for by the allocation of fewer bits in each symbol period, acts to advantage in also attenuating the impulse noise.

The coding and interleaving apparatus can comprise a plurality of data paths providing the encoded data signals with different delays, and a switch for switching different data signals to different data paths.

In an embodiment of the system described below, the coding and interleaving apparatus comprises a first store for storing the plurality of data signals, a second store, an FECC coder coupled between an output of the first store and an input of the second store, and a control unit for controlling the supply of data signals from the first store to the coder and for controlling storage of FECC codewords from the coder into the second store to provide codeword interleaving. The coder can be a programmable FECC coder arranged to be programmed by the control unit to provide different coding for different data signals, and the control unit can provide different depths of interleaving for the FECC codewords of different data signals.

In this case the modulator preferably comprises a table for providing indices of the carriers in order of the number of bits in each transmission symbol period allocated to the carriers, means for reading the respective number of bits for each carrier from the second store in order of the different delays through the coding and interleaving apparatus, and sorting means for supplying the respective bits for modulation onto the respective carriers.

The multicarrier modulation is preferably implemented using a discrete Fourier Transform and preferably incorporates trellis coding. Accordingly the modulator preferably comprises a trellis coder, apparatus for providing an Inverse Fast Fourier Transform (IFFT), a table for providing indices of the carriers in order of the number of bits in each transmission symbol period allocated to the carriers, means for reading the respective number of bits for each carrier from the second store to the trellis coder in order of the different delays through the coding and interleaving apparatus, and a sorter for supplying signal amplitudes supplied by the trellis coder to storage locations of the IFFT apparatus identified by the respective carrier indices.

According to another aspect, the invention provides a data transmission system using multicarrier modulation, comprising: apparatus for applying FECC (forward error correction code) coding and codeword interleaving differently to different data signals to produce encoded data signals with different delays; and means for allocating the encoded data signals to the multiple carriers in dependence upon said delays and in accordance with a predetermined criterion.

Preferably the predetermined criterion comprises transmission attenuation of and/or noise on the carriers, bits of the encoded data signals having relatively less delay being allocated to carriers that are subject to relatively more attenuation and/or noise. Alteratively, the predetermined criterion may comprise the signal-to-noise ratios of the carriers, or another characteristic of the carriers or the transmitted signals that can be monitored by the transmission system, and may take into account a desired distribution of error rates among the carriers.

The invention also provides a method of modulating multiple carriers with signals of a plurality of data channels, comprising the steps of: applying FECC (forward error correcting code) coding and codeword interleaving differently to signals of different data channels to produce encoded data signals having different delays; and modulating different numbers of bits of the encoded data signals onto different carriers.

Preferably the modulating step includes the step of allocating bits of the encoded data signals having relatively less delay to carriers carrying relatively fewer bits.

Preferably the step of applying FECC coding and codeword interleaving comprises the steps of: storing signals of the different data channels; sequentially FECC coding the stored signals to produce FECC codewords; and storing the FECC codewords in an interleaved manner, the interleaving being different for the codewords of the different data channels. The modulating step preferably also includes the step of trellis coding the bits of the encoded data signals.

The invention further extends to a method of modulating multiple carriers with signals of a plurality of data channels, comprising the steps of: applying FECC (forward error correction code) coding and codeword interleaving differently to signals of different data channels to produce encoded data signals having different coding delays; and allocating the encoded data signals to the carriers in dependence upon the coding delays and in accordance with a predetermined criterion. Conveniently the predetermined criterion comprises transmission attenuation of and/or noise on the carriers, bits of the encoded data signals having relatively less delay being allocated to carriers that are subject to relatively more attenuation and/or noise.

BRIEF DESCRIPTION OF THE DRAWINGS

The invention will be further understood from the following description with reference to the accompanying drawings, in which.

DETAILED DESCRIPTION

Figure 1:
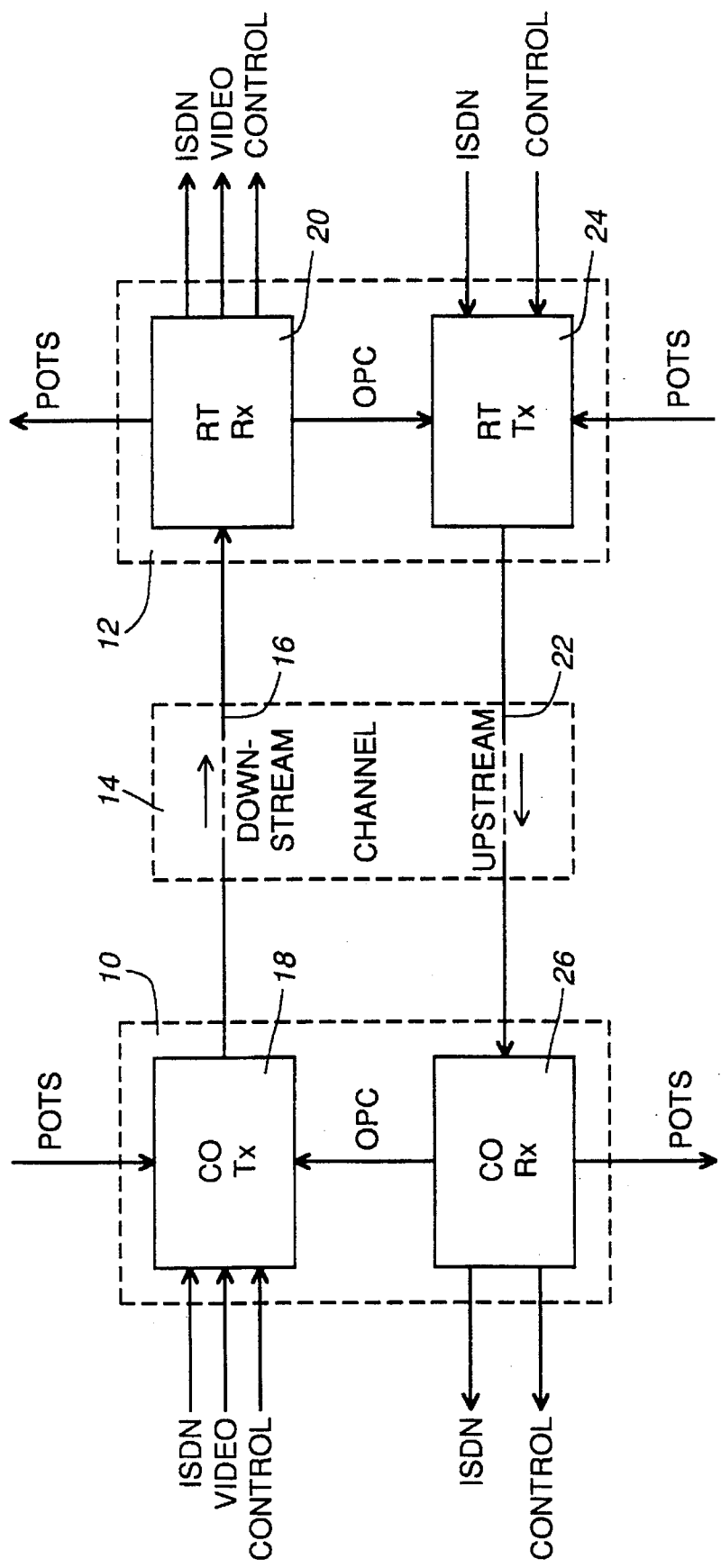
FIG. 1 illustrates a block diagram of an ADSL transmission system using multicarrier modulation in accordance with an embodiment of this invention.

Referring to FIG. 1, an ADSL transmission system comprises a telephone central office (CO) transceiver 10 and remote terminal (RT) transceiver 12, linked via a channel 14 providing a downstream transmission path 16, from a downstream transmitter (Tx) 18 in the CO to a downstream receiver (Rx) 20 in the RT, and an upstream transmission path 22 from an upstream transmitter 24 in the RT to an upstream receiver 26 in the CO.

Signals transmitted in the downstream direction are indicated by way of example as comprising digital video, ISDN, control, and POTS signals, and signals transmitted in the upstream direction are indicated by way of example as comprising ISDN, control, and POTS signals; other types of data may be transmitted in a similar manner. The system is asymmetric in that the video signals, which require a large bandwidth of for example 6 Mb/s as already discussed, are transmitted only in the downstream direction. The other signals, transmitted in both directions, require a much smaller bandwidth. In addition to these signals, an operations control channel (OPC) provides for transmission in both directions on the channel 14 between the transceivers 10 and 12 of control signals required for operation of the transceivers as described below.

The channel 14 is for example a two-wire telephone subscriber line on which the POTS signals are transmitted in a low frequency band below about 10 kHz and on which the other signals are transmitted by multicarrier modulation at higher frequencies. The downstream and upstream signals can be separated by frequency division multiplexing or using echo cancellation techniques.

Figure 2:
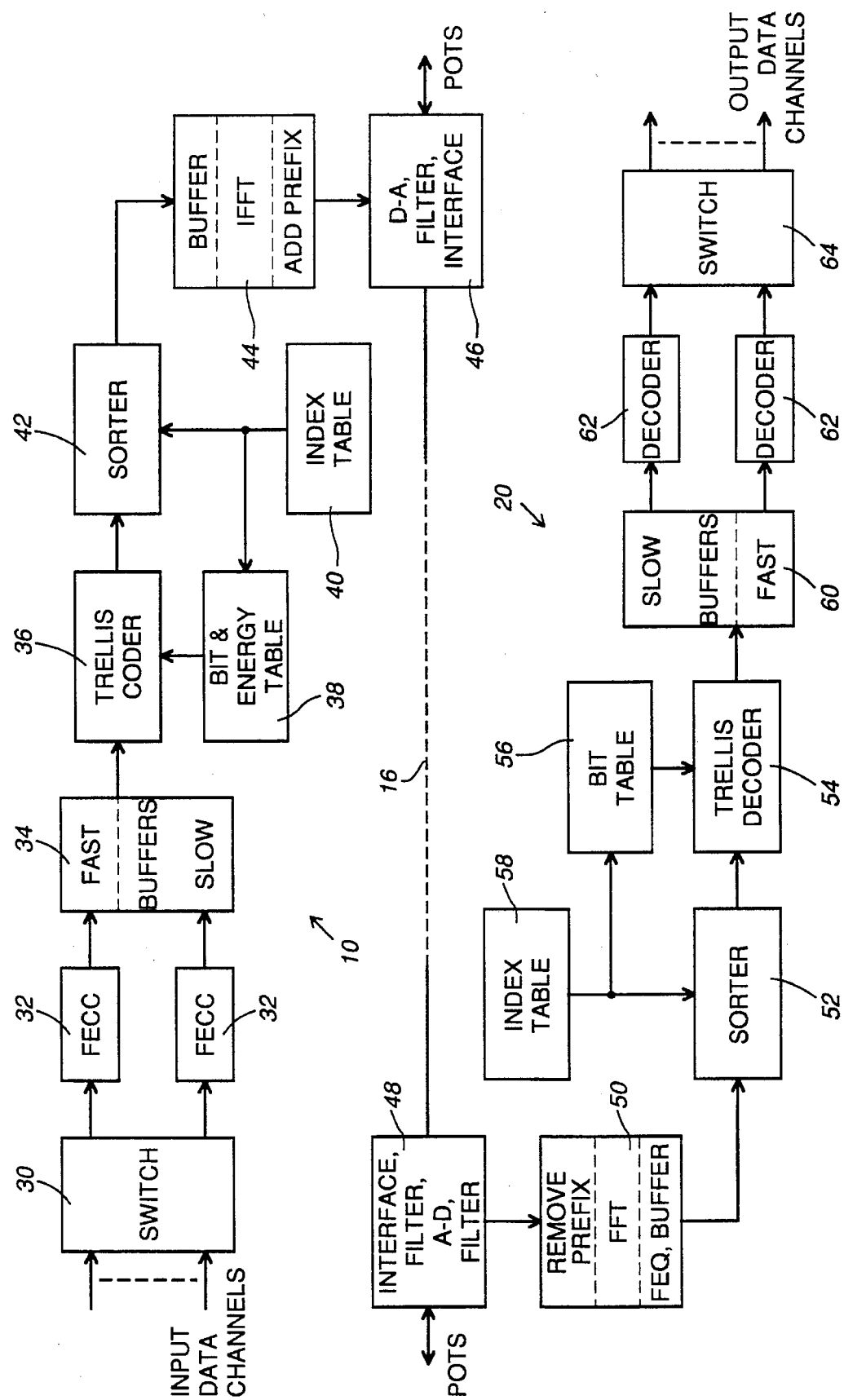
FIG. 2 illustrates a functional block diagram of a downstream transmitter, provided at a telephone CO, and a downstream receiver, provided at a subscriber's premises, of the system of FIG. 1.

Referring to FIG. 2, the downstream transmitter 18 functionally comprises a switch 30, one or more FECC (forward error correcting code) coders 32 two of which are illustrated, data buffers 34, a trellis coder 36 having an associated bit and energy allocation table 38 and a carrier index table 40, a sorter 42, an Inverse Fast Fourier Transform (IFFT) apparatus 44 including a buffer at its input and a prefix adder at its output, and a digital-to-analog converter, analog filter, and line interface block 46. Conversely, the downstream receiver 20 comprises a line interface, analog filter, and analog-to-digital converter block 48 that is assumed also to include a digital filter, an FFT apparatus 50 including a prefix remover at its input and frequency domain equalizers (FEQ) and a buffer at its output, a sorter 52, a trellis decoder 54, operating in accordance with the Viterbi algorithm to perform maximum likelihood sequence estimation in known manner, having an associated bit allocation table 56 and carrier index table 58, data buffers 60, one or more FECC decoders 62 complementary to the coders 32, and a switch 64.

The components 44 to 50 form a multicarrier modulation or DMT transmission system of generally known form, to which system the components 36, 38, 54, and 56 add trellis coding and decoding in generally known manner. In this system data signals, constituted by the video, ISDN, control, and OPC signals represented in FIG. 1, are frequency division multiplexed at frequencies above about 10 kHz, i.e. above the frequencies of POTS telephone signals that are supplied to and derived from the blocks 46 and 48 and are separated by the analog filters within these blocks.

By way of example, the DMT system may have 256 carriers with a frequency spacing of 4 kHz, the discrete Fourier transform accordingly having a length of N=512, with a symbol period of 250 μs and about 1700 bits per symbol to provide a total transmission rate of about 6.8 Mb/s, with each carrier or subchannel carrying a number of bits in each symbol period that depends on the characteristics (e.g. signal to noise ratio, or SNR) of the subchannel. The number of bits carried by each subchannel in each symbol period can be zero (i.e. the subchannel is not being used) or can vary from a minimum number, for example 1 or 2 bits, to a maximum number, for example in a range from 10 to 16 bits. Because the subchannels carry variable numbers of bits, the total transmission rate of the system is not fixed but can be increased or decreased to meet particular requirements.

Signals from a plurality of input data channels, for example information and control channels as discussed above, are supplied to inputs of the switch 30, which switches these signals to one of a plurality of outputs each coupled to a respective one of the plurality of FECC coders 32. Although two FECC coders 32 are shown in FIG. 2, a different number of such coders may alternatively be provided. Each FECC coder 32 provides a respective degree of FECC coding and interleaving, and hence reliability of the data signals that it encodes, and a corresponding transmission delay. The switch 30 switches the data signals to the respective outputs and hence FECC coders in accordance with latency (i.e. transmission delay) and reliability requirements for the respective signals. As already indicated, such requirements can vary for different types of signals, and for signals on a single channel at different times.

The particular characteristics of the individual FECC coders 32 are not important to the invention, but the different coders have different degrees of interleaving so that the transmitted data signals have different susceptibilities to impulse noise as discussed further below. For example, one of the FECC coders 32 may provide coding with relatively short term or no interleaving, or even may be omitted entirely, thus propagating data signals with little or no delay but with a relatively high susceptibility to impulse noise, and the other of the coders 32 may provide coding with interleaving over relatively long periods, thereby propagating data signals with a high immunity to impulse noise but with a relatively long delay.

The data signal codewords output from the FECC coders 32 are buffered in the buffers 34, which are represented in FIG. 2 as being divided into relatively fast, i.e. short delay, buffers and relatively slow, or long delay, buffers, corresponding to the respective interleaving periods associated with the respective FECCs 32. In practice, as described below, the storage in the buffers 34 is used in implementing the FECC interleaving. The units 36 to 42 serve to read bits of the codewords from the buffers 34, implement trellis coding, and supply the resulting amplitudes to the IFFT apparatus 44 in each transmission symbol period for transmission via the multicarrier subchannels. The operation of the units 36 to 42 is described further below.

Conversely, in the receiver 20 amplitudes produced by the FFT apparatus 50 are converted by the units 52 and 54 to codeword bits that are supplied to the buffers 60, the codewords being de-interleaved and decoded by the FECC decoders 62, each of which operates in a complementary manner to a respective one of the FECC coders 32. From the FECC decoders 62 the decoded data signals are supplied to respective output data channels via the switch 64.

Although details of the units 44 to 50 are not significant to the present invention, it is noted here that the prefix added at the output of the IFFT apparatus 44 consists of a repetition of information from the end of a data block in order to provide a guard space to eliminate interference from one transmitted symbol to the next. The digital filter in the block 48 is a time domain equalizer in the form of a finite impulse response filter that limits such interference to less than the length of the prefix, the prefix then being removed or subtracted at the input of the FFT apparatus 50 thereby eliminating the interference. The frequency domain equalization (FEQ) at the output of the FFT apparatus 50 operates individually on each subchannel and adaptively adjusts for the attenuation and delay of each carrier.

In addition it is observed that, while preferred, the use of trellis coded modulation is not essential to the invention. Accordingly the trellis coder 36, which converts data bits from the buffers 34 into scaled amplitudes for the IFFT apparatus 36 as well as implementing the trellis coding, may be replaced by simpler apparatus for converting data bits into scaled amplitudes without any trellis coding, with a complementary replacement of the trellis decoder 54.

As is well known and discussed above, in each symbol period of a system using multicarrier modulation different subchannels carry different numbers of bits, in accordance with the SNR of the respective subchannels. Typically, it may be desired for all of the subchannels to have substantially the same SNR as monitored at the receiver, and this is assumed by way of example in the remainder of this description, but other distributions of SNR among subchannels may be desirable and can alteratively be provided. The SNR of each subchannel is dependent upon the attenuation and the noise level of the subchannel. Accordingly, subchannels with a relatively high attenuation or noise level are allocated relatively fewer bits, and hence a greater signal point spacing at the transmitter, than subchannels with a relatively low attenuation or noise level. Due to the different subchannel attenuations, the signal point spacing at the receiver (and the bit error rate) is approximately the same for all of the subchannels. Thus the characteristics of the subchannels are substantially compensated for by an appropriate distribution of the number of bits carried by each subchannel.

The invention recognizes that impulse noise can be coupled onto the transmission path at any point along its length, and from its coupling point to the receiver 20 is subjected to the same frequency-dependent attenuation as the data signals. (Impulse noise may also be introduced in the transmitter 10 as a result of clipping in digital logic or at the digital-to-analog converter, this possibly being introduced deliberately in order to reduce implementation costs.) Consequently, impulse noise that appears on the relatively more attenuating subchannels, which carry relatively fewer bits in each symbol period, is relatively more attenuated at the receiver. It follows that subchannels carrying relatively fewer bits in each symbol period are less susceptible to impulse noise (because of the greater attenuation) than subchannels carrying relatively more bits in each symbol period.

In order to provide the best possible overall performance, corresponding to all of the data signals having substantially the same immunity to impulse noise, the invention matches those data signals that are the most susceptible to impulse noise, by virtue of interleaving of the FECC codewords over relatively shorter periods, with the subchannels that have the most attenuation (and hence carry the fewest number of bits in each symbol period) and hence on which the impulse noise is most attenuated so that it has the least effect at the receiver.

To this end, in the transmitter 18, the index table 40 is arranged to store the index, or number, i of each subchannel sorted in order of increasing number of bits $b_i$ (from the minimum number to the maximum number as discussed above) per symbol period allocated to the subchannels. In each symbol period, the sorted indices i are read in turn from the index table 40 and used to address the table 38, and are supplied to the sorter 42. The allocated number of bits to be used for the respective subchannel, and an energy scale factor for the subchannel, are accordingly read from the table 38 and supplied to the trellis coder 36, which reads the allocated number of bits from the buffers 34 starting with the fastest (least interleaving and delay) buffer and progressing gradually through all of the bits to be read and transmitted in the symbol period, ending with the slowest (most interleaving and delay) buffer. For each subchannel index i the trellis coder 36 produces amplitudes, representing a signal point in a constellation of $2^{b_i}$ signal points and scaled in accordance with the energy scale factor for the subchannel, which are written by the sorter 42 into a position i in the buffer at the input of the IFFT apparatus 44.

In the receiver 20, the index table 58 is the same as the index table 40, and the bit allocation table 56 stores the same allocations of number of bits for each subchannel as the table 38. As in the transmitter, in each symbol period the sorted indices i are read in turn from the index table 58, are supplied to the sorter 52, and are used to address the table 56. The allocated number of bits used for the respective subchannel i are read from the table 56 and supplied to the trellis decoder 54, which reads the amplitudes from the position i in the output buffer of the FFT apparatus 50 as identified by the sorter 52 and supplies the relevant number of bits to the buffers 60, starting in each symbol period with the fastest (least interleaving and delay) buffer and progressing gradually to the slowest (most interleaving and delay) buffer. The operation of the FECC decoders 62 and the switch 64 is the inverse of the coders 32 and switch 30.

Figure 3:
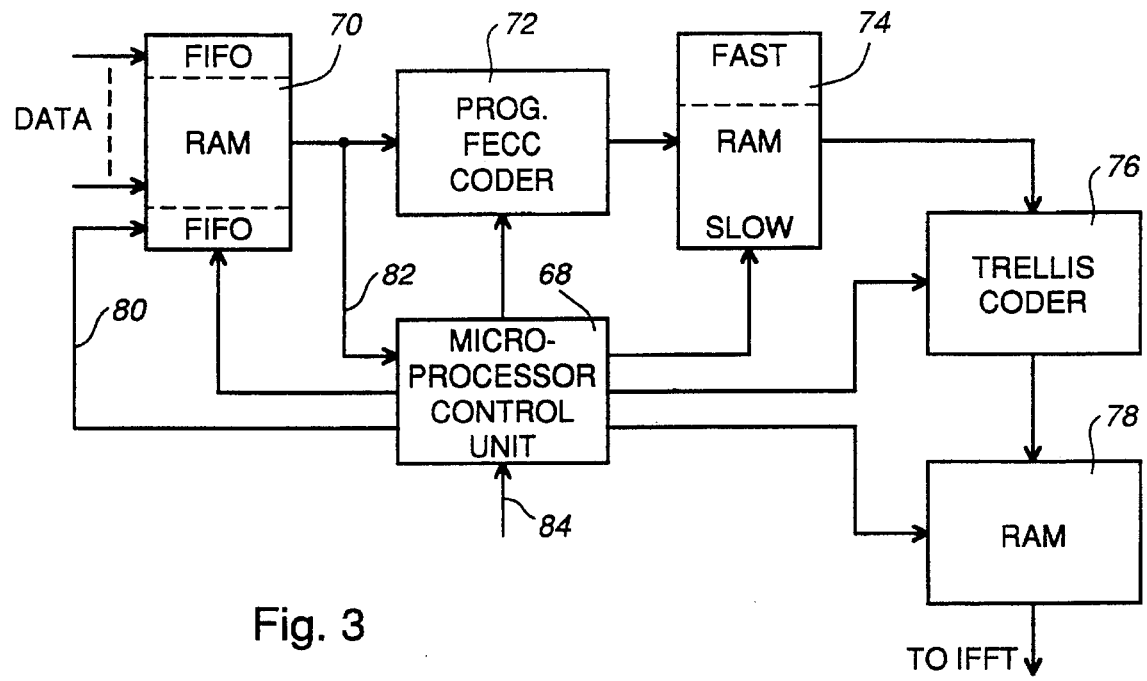
FIG. 3 illustrates a block diagram of an embodiment of parts of the downstream transmitter.

The various units in the transceivers 10 and 12 can be implemented in various ways, using arrangements of hardware and/or software. FIG. 3 illustrates by way of example a block diagram of one embodiment of the units 30 to 42, and the buffer at the input of the IFFT apparatus 44, of the downstream transmitter 18.

Referring to FIG. 3, a microprocessor control unit 68, which may comprise one or more microprocessors such as digital signal processors for carrying out respective functions, is coupled via various control paths to a RAM (random access memory) 70 that operates as the switch 30 in FIG. 2, a programmable FECC coder 72 that constitutes the plurality of FECC coders 32 in FIG. 2, a RAM 74 that corresponds to the buffers 34, a trellis coder 76 corresponding to the trellis coder 36, and a RAM 78 that constitutes the buffer at the input of the IFFT apparatus 44 in FIG. 2. The RAM 70, shown with multiple inputs for simplicity, is supplied at its input with the input data channels and OPC data from the control unit 68 via a path 80, and the control unit 68 is supplied with information from the control channel (e.g. for selecting between high reliability and short delay for the transmitted data channels) via a path 82 and with OPC data from the receiver 26 (FIG. 1) via a path 84.

The RAM 70 is controlled by the control unit 68 to operate as a plurality of FIFOs (first-in, first-out buffers) or elastic stores in which data from the various input data channels is stored and from which the data is read to the coder 72. The control unit 68 monitors the difference between input and output pointers for each FIFO and uses known stuffing techniques to synchronize the input data channel signals to a common multicarrier transmission clock.

The programmable FECC coder 72 is a conventional Reed-Solomon FECC coder using the polynomial generator $$\prod_{j=0}^{R-1} (Z + \alpha^j)$$

where R is the number of redundant FECC check bytes, $\alpha$ is a root of the primitive polynomial $x^8+x^4+x^3+x^2+1$, and Z is the polynomial variable. The coder 72 is programmed by the control unit 68 to perform sequentially the functions of the plurality of FECC coders 32 in FIG. 2, and R can be different for different FIFOs of the RAM 70.

The resulting FECC codewords are stored in the RAM 74 under the control of the control unit 68, which also implements convolutional interleaving of at least some of the codewords in storing them in the part of the RAM identified as "slow". The codewords stored in the part of the RAM 74 identified as "fast" are relatively undelayed, either not being interleaved or being interleaved over short periods. Thus the designation of the fast and slow parts of the RAM 74 refer to the time required for the FECC coded data to become available at the output of the RAM 74 after the FECC codeword interleaving that is implemented on that data. In the interleaving process, the k-th byte in each FECC codeword is delayed by 1+(d−1)k bytes, where d is an integer referred to as the depth of interleaving. Obviously, the greater the depth d of interleaving, the longer is the transmission delay before the input data can be read from the RAM 74, and the control unit 68 can determine an individual value of d as desired for the different input data channels.

The control unit 68 also implements the index table 40 and the bit and energy allocation table 38 represented in FIG. 2, and maintains this information current through communications via the OPC (which communications also pass through the FECC coder 72). The control unit 68 reads data bits from the RAM 74 to the trellis coder 76, and stores the resulting amplitudes in the appropriate locations in the IFFT RAM 78, in accordance with the data in these tables and in the manner already described.

A complementary arrangement can be provided in the receiver 20, it being noted that in this case the de-interleaving is carried out in a manner that leaves the codeword boundaries for the interleaved codewords intact to facilitate decoding of the different codewords using a common decoder.

Figure 4:
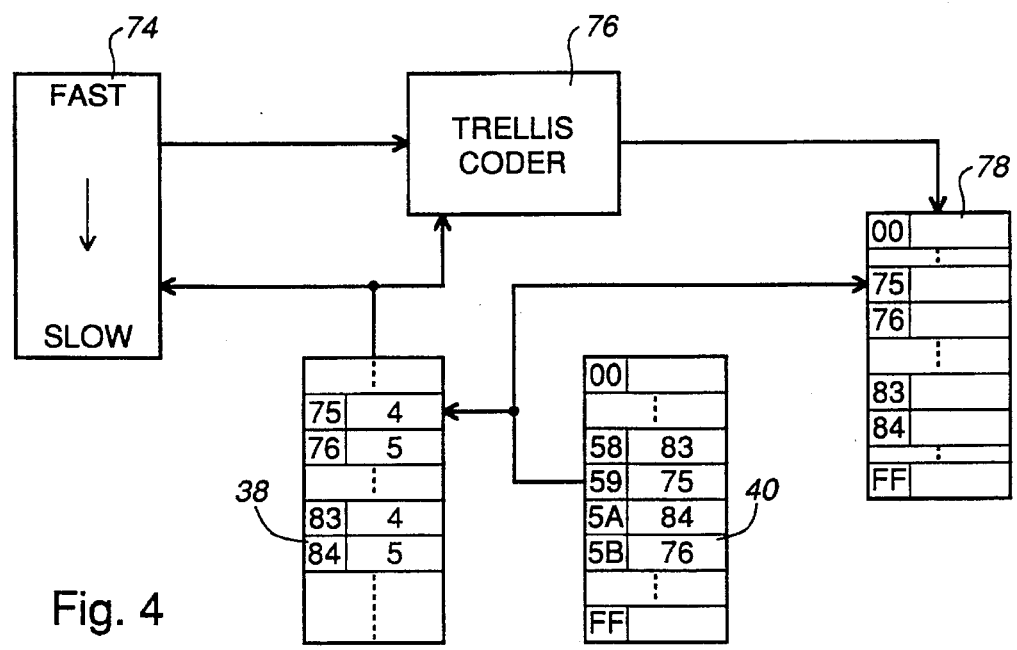
FIG. 4 is a diagram illustrating the operation of parts of the downstream transmitter.

FIG. 4 diagrammatically further illustrates the operation of the arrangement described above for transferring data bits from the RAM 74 to the trellis coder 76 and for transferring the consequent amplitudes from the trellis coder 76 into the RAM 78, in accordance with information stored in the tables 38 and 40.

As indicated in FIG. 4, the table 40 has 256 locations, hexadecimal 00 to FF, which store the subchannel indices i in order of increasing numbers of bits allocated to the subchannels. Likewise, the table 38 has 256 locations 00 to FF each of which stores for the respective subchannel the number of bits allocated to the subchannel (and the energy scale factor, not represented in FIG. 4), and the RAM 78 has 256 locations 00 to FF for storing the amplitudes supplied by the trellis coder 76 for the respective subchannels. For example, location 59 in the index table 40 stores the channel index 75, for which 4 bits are allocated in the table 38. The next (in sequential order) location 5A in the table 40 contains the channel index 84, for which a higher number (5) bits are allocated in the table 38. The next location 5B in the table 40 stores the channel index 76, for which 5 bits are allocated in the table 38, and so on.

In each symbol period, the locations of the table 40 are addressed sequentially from 00 to FF to read out the respective subchannel indices, and these are used to address the table 38 and the RAM 78. The number of bits identified for each channel index by the table 40 are read from the RAM 74, a read address pointer for this RAM being incremented by this number of bits in a direction from the "fast" (least delayed data) to the "slow" (most delayed data) end of this RAM 74 as indicated by a downwardly pointing arrow in FIG. 4. The trellis coder 76 produces the coded and energy scaled amplitudes from these bits, and these are stored in the RAM 78 at the address of the subchannel supplied from the index table 40.

It can be seen that the embodiment of the invention described above provides two significant improvements over known transmission systems using multicarrier modulation.

Firstly, it provides different levels of FECC coding and, especially, interleaving that can be used for different types of data signals. Thus a digital video signal, which may be highly compressed and therefore which is particularly vulnerable to errors, can be transmitted in a very reliable manner with a high degree of FECC coding and interleaving over relatively long time periods, and hence with a relatively long transmission delay, which is not a significant factor for video signals. In contrast, a voice signal, which may for example be included within an ISDN data stream, and which is relatively insensitive to errors but for which long transmission delays are not tolerable, can be transmitted with little or no FECC coding and interleaving, and hence little transmission delay, but with a reduced immunity to impulse noise due to the interleaving being omitted or carried out over short time periods. With appropriate selection of the values of R and d under the control of the control unit 68 as described above, each type of data signal can be transmitted with the best compromise, individually for that type of signal, between reliability and transmission delay.

Secondly, having compensated for the different characteristics of the subchannels by allocating different numbers of bits for transmission in different subchannels, the system then allocates the data signals that are the most vulnerable to errors due to impulse noise, i.e. the data signals that are to be transmitted with the least delay and hence with no interleaving or with interleaving over the shortest time periods, to the subchannels that carry the fewest bits, and hence are the least susceptible to impulse noise because of their relatively higher attenuation.

Although a particular embodiment of the invention has been described in detail, it should be appreciated that numerous modifications, variations, and adaptations may be made without departing from the scope of the invention as defined in the claims.

For example, the numbers of bits allocated to the different subchannels may be determined also to take into account factors other than the SNR monitored at the receiver, for example subchannels at low frequencies may be assigned relatively fewer bits to reduce the effects of interference with POTS signals, and the allocation of numbers of bits to subchannels may also be weighted in accordance with other factors such as sources of interference. Accordingly, the sorting of subchannels in the index tables 40 and 58 may be modified to suit particular requirements; for example it may be in accordance with actual subchannel attenuations or SNRs monitored at the receiver 20, rather than in accordance with the number of bits allocated to the subchannels. In any event, the index tables 40 and 58 sort the subchannels into a generally non-sequential order which is determined to be desirable to reduce the effects of impulse noise on those data signals which, due to their requirements for the least transmission delays, are the least interleaved and hence are the most susceptible to impulse noise.

What is claimed is:

1. A data transmission system using multicarrier modulation, comprising:

FECC (forward error correction code) coding and codeword interleaving apparatus arranged for differently encoding a plurality of data signals to provide a plurality of encoded data signals with different delays through the coding and interleaving apparatus, the coding and interleaving apparatus comprises a plurality of data paths providing the encoded data signals with different delays, and a switch for switching different data signals to different data paths; and a modulator arranged to modulate bits of the encoded data signals onto multiple carriers of the transmission system, different numbers of bits in each transmission symbol period being allocated to different carriers.

2. A data transmission system using multicarrier modulation, comprising:

FECC (forward error correction code) coding and codeword interleaving apparatus arranged for differently encoding a plurality of data signals to provide a plurality of encoded data signals with different delays through the coding and interleaving apparatus, the coding and interleaving apparatus comprises a first store for storing the plurality of data signals, a second store, an FECC coder coupled between an output of the first store and an input of the second store, and a control unit for controlling the supply of data signals from the first store to the coder and for controlling storage of FECC codewords from the coder into the second store to provide codeword interleaving; and a modulator arranged to modulate bits of the encoded data signals onto multiple carriers of the transmission system, different numbers of bits in each transmission symbol period being allocated to different carriers.

3. A data transmission system as claimed in claim 2 wherein the coder is a programmable FECC coder arranged to be programmed by the control unit to provide different coding for different data signals.

4. A data transmission system as claimed in claim 2 wherein the control unit provides different depths of interleaving for the FECC codewords of different data signals.

5. A data transmission system using multicarrier modulation, comprising:

FECC (forward error correction code) coding and codeword interleaving apparatus arranged for differently encoding a plurality of data signals to provide a plurality of encoded data signals with different delays through the coding and interleaving apparatus; and a modulator arranged to modulate bits of the encoded data signals onto multiple carriers of the transmission system, different numbers of bits in each transmission symbol period being allocated to different carriers, the modulator comprises apparatus for providing an Inverse Fast Fourier Transform.

6. A data transmission system using multicarrier modulation, comprising:

FECC (forward error correction code) coding and codeword interleaving apparatus arranged for differently encoding a plurality of data signals to provide a plurality of encoded data signals with different delays through the coding and interleaving apparatus; and a modulator arranged to modulate bits of the encoded data signals onto multiple carriers of the transmission system, different numbers of bits in each transmission symbol period being allocated to different carriers, the modulator comprises a trellis coder.

7. A data transmission system using multicarrier modulation, comprising:

FECC (forward error correction code) coding and codeword interleaving apparatus arranged for differently encoding a plurality of data signals to provide a plurality of encoded data signals with different delays through the coding and interleaving apparatus, the coding and interleaving apparatus comprises a plurality of data paths providing the encoded data signals with different delays, and a switch for switching different data signals to different data paths; and a modulator arranged to modulate bits of the encoded data signals onto multiple carriers of the transmission system, different numbers of bits in each transmission symbol period being allocated to different carriers, and the modulator is arranged to allocate bits of encoded data signals having relatively less interleaving to carriers carrying relatively fewer bits in each symbol period.

8. A data transmission system using multicarrier modulation, comprising:

FECC (forward error correction code) coding and codeword interleaving apparatus arranged for differently encoding a plurality of data signals to provide a plurality of encoded data signals with different delays through the coding and interleaving apparatus the coding and interleaving apparatus comprises a first store for storing the plurality of data signals, a second store, an FECC coder coupled between an output of the first store and an input of the second store, and a control unit for controlling the supply of data signals from the first store to the coder and for controlling storage of FECC codewords from the coder into the second store to provide codeword interleaving; and a modulator arranged to modulate bits of the encoded data signals onto multiple carriers of the transmission system, different numbers of bits in each transmission symbol period being allocated to different carriers, and the modulator is arranged to allocate bits of encoded data signals having relatively less interleaving to carriers carrying relatively fewer bits in each symbol period.

9. A data transmission system as claimed in claim 8 wherein the coder is a programmable FECC coder arranged to be programmed by the control unit to provide different coding for different data signals.

10. A data transmission system as claimed in claim 8 wherein the control unit provides different depths of interleaving for the FECC codewords of different data signals.

11. A data transmission system as claimed in claim 8 wherein the modulator comprises a table for providing indices of the carriers in order of the number of bits in each transmission symbol period allocated to the carriers, means for reading the respective number of bits for each carrier from the second store in order of the different delays through the coding and interleaving apparatus, and sorting means for supplying the respective bits for modulation onto the respective carriers.

12. A data transmission system as claimed in claim 8 wherein the modulator comprises a trellis coder, apparatus for providing an Inverse Fast Fourier Transform (IFFT), a table for providing indices of the carriers in order of the number of bits in each transmission symbol period allocated to the carriers, means for reading the respective number of bits for each carrier from the second store to the trellis coder in order of the different delays through the coding and interleaving apparatus, and a sorter for supplying signal amplitudes supplied by the trellis coder to storage locations of the IFFT apparatus identified by the respective carrier indices.

13. A data transmission system using multicarrier modulation, comprising:

FECC (forward error correction code) coding and codeword interleaving apparatus arranged for differently encoding a plurality of data signals to provide a plurality of encoded data signals with different delays through the coding and interleaving apparatus; and a modulator arranged to modulate bits of the encoded data signals onto multiple carriers of the transmission system, different numbers of bits in each transmission symbol period being allocated to different carriers, and the modulator being arranged to allocate bits of encoded data signals having relatively less interleaving to carriers carrying relatively fewer bits in each symbol period, the modulator comprises apparatus for providing an Inverse Fast Fourier Transform.

14. A data transmission system using multicarrier modulation, comprising:

FECC (forward error correction code) coding and codeword interleaving apparatus arranged for differently encoding a plurality of data signals to provide a plurality of encoded data signals with different delays through the coding and interleaving apparatus; and a modulator arranged to modulate bits of the encoded data signals onto multiple carriers of the transmission system, different numbers of bits in each transmission symbol period being allocated to different carriers, and the modulator being arranged to allocate bits of encoded data signals having relatively less interleaving to carriers carrying relatively fewer bits in each symbol period, the modulator comprises a trellis coder.

15. A method of modulating multiple carriers with signals of a plurality of data channels, comprising the steps of:

applying FECC (forward error correcting code) coding and codeword interleaving differently to signals of different data channels to produce encoded data signals having different delays; and modulating different numbers of bits of the encoded data signals onto different carriers, wherein the step of applying FECC coding and codeword interleaving comprises the steps of:
storing signals of the different data channels;
sequentially FECC coding the stored signals to produce FECC codewords: and
storing the FECC codewords in an interleaved manner, the interleaving being different for the codewords of the different data channels.

16. A method as claimed in claim 15 wherein the modulating step includes the step of trellis coding the bits of the encoded data signals.

17. A method as claimed in claim 15 wherein the modulating step includes the step of allocating bits of the encoded data signals having relatively less delay to carriers carrying relatively fewer bits.

18. A method as claimed in claim 17 wherein the modulating step includes the step of trellis coding the bits of the encoded data signals.

19. A method for transmitting data signals to at least one receiver using multiple carriers, comprising:

receiving data signals to be transmitted from a plurality of input data channels;

applying error correcting coding and interleaving such that the degree of interleaving differs depending on the input data channel, thereby producing encoded data signals having different delays;

modulating different numbers of bits of the encoded data signals onto different carriers based on the susceptibility of the different channels to noise, thereby producing modulated data signals, the smaller the delay of the encoded data signals the fewer the number of bits said modulating uses when producing the modulated data signals for the different carriers; and transmitting the modulated data signals to the at least one receiver using the different carriers.

20. A method as claimed in claim 19 wherein the data signals received are digital signals, and the modulated data signals are converted to analog signals before they are transmitted.

21. A method for transmitting data signals to at least one receiver using multiple carriers, comprising:

receiving data signals to be transmitted from a plurality of input data channels;

applying error correcting coding and interleaving such that the degree of interleaving differs depending on the input data channel, thereby producing encoded data signals having different delays;

modulating different numbers of bits of the encoded data signals onto different carriers based on the susceptibility of the different channels to noise, thereby producing modulated data signals;

transmitting the modulated data signals to the at least one receiver using the different carriers;

storing, for each of the carriers, a value corresponding to the number of bits allocated to the carrier; and sorting the carriers in accordance with the stored values.

22. A data transmission system using multicarrier modulation, comprising:

FECC (forward error correction code) coding and codeword interleaving apparatus arranged for differently encoding a plurality of data signals to provide a plurality of encoded data signals with different delays through the coding and interleaving apparatus; and a modulator arranged to modulate bits of the encoded data signals onto multiple carriers of the transmission system, different numbers of bits in each transmission symbol period being allocated to different carriers, wherein the modulator comprises:
a table for storing a value corresponding to the number of bits allocated to the carriers; and
a sorter for sorting the carriers in accordance with the stored values.

\* \* \* \* \*

UNITED STATES PATENT AND TRADEMARK OFFICE
CERTIFICATE OF CORRECTION

PATENT NO.    : 5,596,604
DATED         : January 21, 1997
INVENTOR(S)   : Cioffi et al.

It is certified that error appears in the above-indentified patent and that said Letters Patent is hereby corrected as shown below:

Column 7, line 23, change "alteratively" to --alternatively--.

Column 12, line 31, after "apparatus" insert --,--.

Signed and Sealed this

Twelfth Day of August, 1997

*Attest:*

BRUCE LEHMAN

*Attesting Officer*       Commissioner of Patents and Trademarks